(No Model.)

J. M. SULLIVAN.
FERTILIZER DISTRIBUTER.

No. 356,175. Patented Jan. 18, 1887.

Witnesses
S. H. Johansen.
G. P. Kramer.

Inventor
James M. Sullivan
By his Attorneys
R. S. & A. P. Lacey

United States Patent Office.

JAMES M. SULLIVAN, OF THOMASTON, GEORGIA, ASSIGNOR OF ONE-HALF TO G. W. T. HANNAH, OF SAME PLACE.

FERTILIZER-DISTRIBUTER.

SPECIFICATION forming part of Letters Patent No. 356,175, dated January 18, 1887.

Application filed September 30, 1886. Serial No. 214,971. (No model.)

*To all whom it may concern:*

Be it known that I, JAMES M. SULLIVAN, a citizen of the United States, residing at Thomaston, in the county of Upson and State of Georgia, have invented certain new and useful Improvements in Fertilizer-Distributers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to that class of devices for planting seed and fertilizers, and has for its object to devise a simple machine, economical in cost, efficient in use, and easily managed by any person, and not liable to get out of repair.

It consists of the novel features more fully and particularly hereinafter set forth, claimed, and shown in the annexed drawings, in which—

Figure 1:
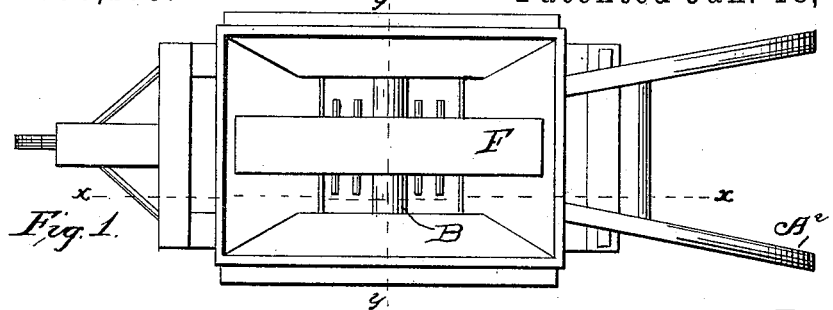
Figure 2:
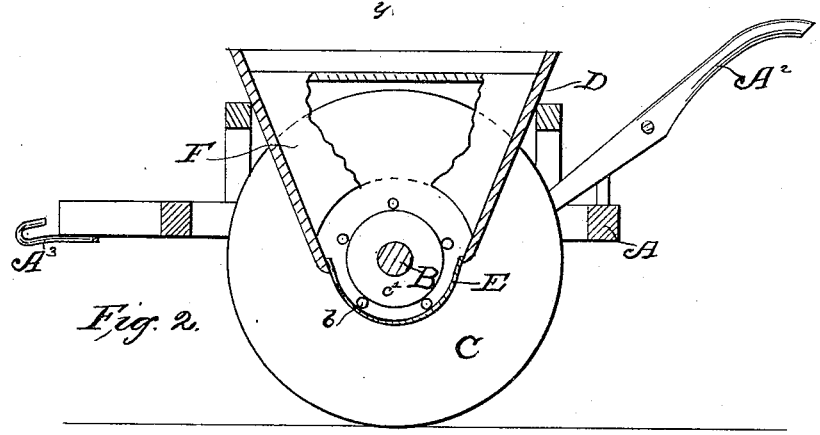
Figure 3:
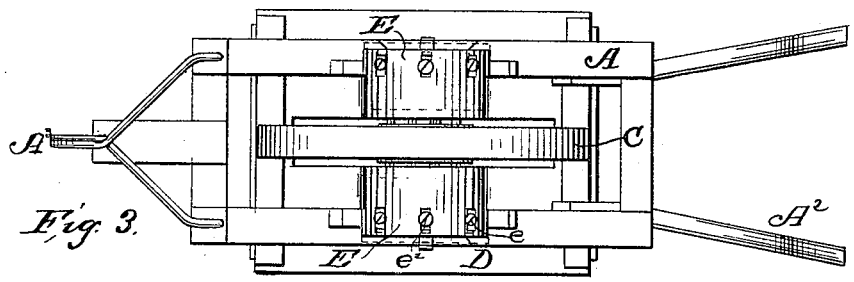
Figure 4:
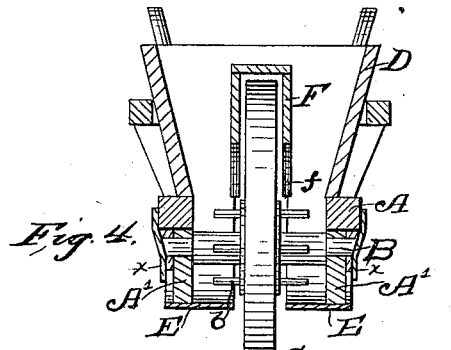

Figure 1 is a plan view. Fig. 2 is a section on the line $x\ x$ of Fig. 1, parts being broken away. Fig. 3 is an inverted plan view. Fig. 4 is a sectional view on the line $y\ y$ of Fig. 1.

The device comprises the frame A, supported by the axle B and wheel C, hopper D, and the adjustable slides E.

The hopper sits astraddle the wheel C, which works through its bottom and part way through the lower portions of its front and rear walls. A casing, F, secured at each end to the front and rear walls of the hopper, divides it into two compartments and protects the contacting with the outer periphery of the wheel. By this construction earth, roots, &c., are prevented from mixing with the contents of the hopper and causing them to adhere and form a plastic mass.

The wheel is of a uniform thickness for some distance from its center, and may continue so to the periphery or not, as desired. Agitator arms or pins $b$ extend from the sides of the wheel in opposite directions, and are located at a short distance from the axle and arranged in a circle. In the operation of the device these arms back up and prevent the clogging of the contents of the hopper and compel it to be discharged, two of these pins or agitators to be long enough to reach across hopper device at bottom or not, as desired to be used.

The plates or slides E are bent or curved and fitted to the curved faces of the pieces A', depending from the frame or hopper. The edges farther removed from the wheel are provided with slots $e$ for the passage of adjusting-screws $e'$, by which they are adjustably held in place. By loosening the screws the plates may be adjusted nearer to or farther from the wheel, thus diminishing or increasing the distance between the inner edges and the sides of the wheel. To regulate the supply and quantity of seed or fertilizer to be planted, the proper adjustment having been made, the plates are held fast by screwing home the screws previously loosened. The agitator-arms work close to the plates and compel the contents of the hopper to pass through the space between the sides of the wheel and the inner edges of the slides.

It is evident that, by reason of the casing F dividing the hopper into two separate compartments, seed may be discharged from the one fertilizer to the other, or the one may be used independently of the other.

The lower portions of the sides of the casing F are cut away on the arc of a circle to give room for the agitator-arms, and the edge is beveled, forming a chisel-edge, $f$, which removes and prevents any fertilizer, &c., from adhering and being carried within the casing and clogging therein.

Wear-plates $c'$ are located on each side of the wheel and surround the axle.

The device is provided with handles $A^2$ and a clevis or draft-hook, $A^3$.

From the foregoing description and the annexed drawings the operation of the machine may be readily comprehended.

It will be manifest that small covering plows or shovels may be arranged in rear of the hopper; also, that plows or shovels for opening the furrow can be arranged in front of the hopper.

Having thus described my invention, what I claim, and desire to secure by Letters Patent, is—

The combination of the frame, the hopper, the drive-wheel having agitator-arms, the double-walled casing protecting the upper portion of the wheel and dividing the hopper into two compartments, the pieces located on each side of the wheel depending from the frame and having their lower edges curved, the curved slides forming the bottom of the hopper fitted to said curved edges, and the screws for holding them in an adjusted position, substantially as set forth.

In testimony whereof I affix my signature in presence of two witneses.

JAMES M. SULLIVAN.

Witnesses:
J. C. WILLIAMS,
B. D. HARDAWAY.